UNITED STATES PATENT OFFICE.

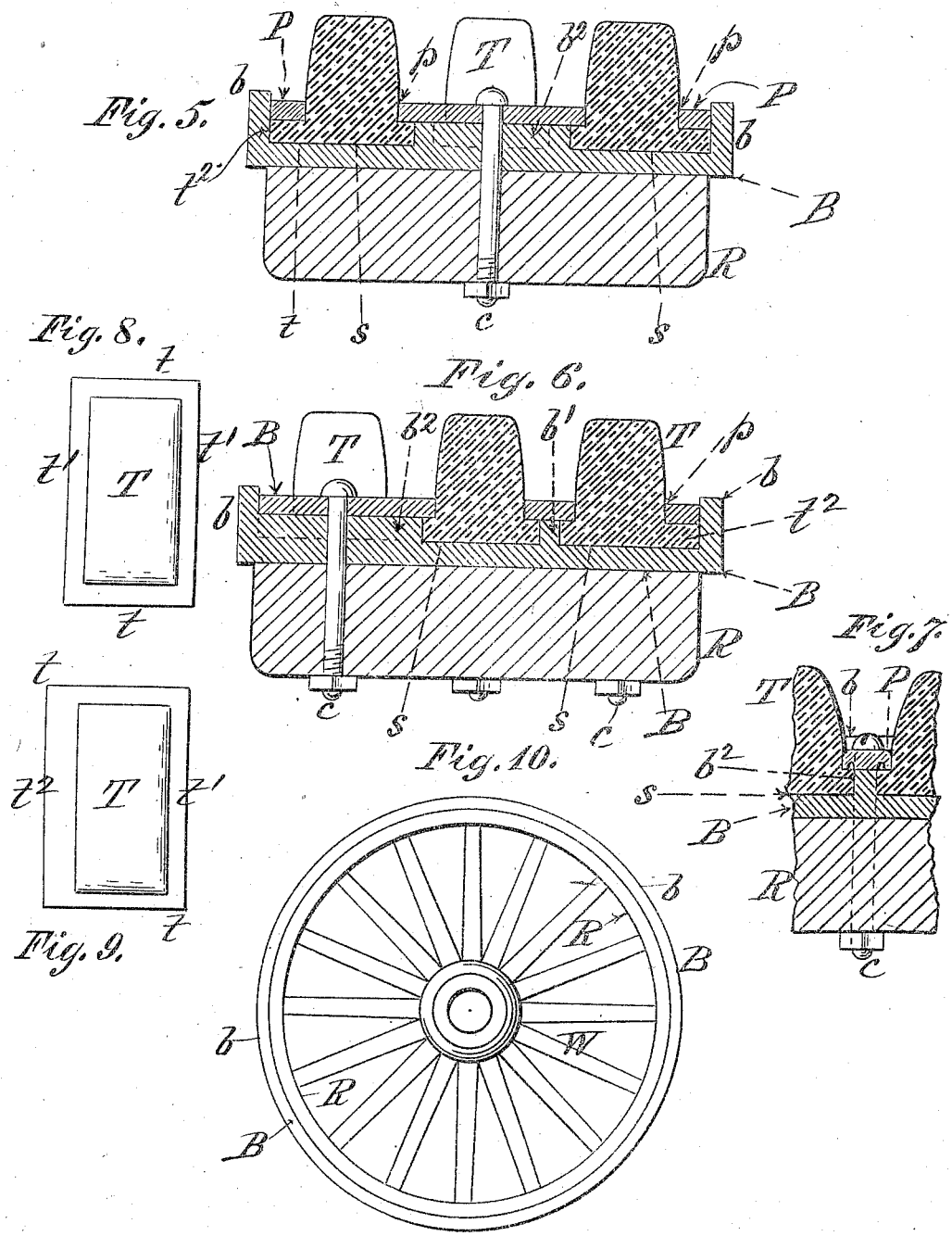

JOHN J. PATTON, OF NEW YORK, N. Y.

TIRE.

979,883.      Specification of Letters Patent.      Patented Dec. 27, 1910.

Application filed August 22, 1910. Serial No. 578,291.

*To all whom it may concern:*

Be it known that I, JOHN J. PATTON, a citizen of the United States, residing in the borough of Manhattan, city, county, and State of New York, have invented certain new and useful Improvements in Tires, of which the following is a specification.

It is a well known fact that there is a growing demand for heavy traction vehicles of greater strength and capacity, vehicles of this class being now made for commercial purposes of a weight of seven or eight tons and capable of carrying as many more tons of merchandise. In other words both weight of vehicle and load have doubled in a comparatively short period of time, which means that the elastic resilient treads are now frequently subjected to a dead weight of fifteen or more tons when a vehicle is loaded to its full capacity. As a result of this excessive weight the rubber treads become overheated and consequently soon deteriorate.

One of the objects of my present invention is to obviate this difficulty by providing for the use of relatively small elastic tread blocks properly spaced and arranged with relation to each other to prevent overheating, while affording an even, continuous tread.

Another object is to afford a tire of this character of great simplicity, strength, and cheapness of structure.

The invention consists in the specific construction and arrangement of parts herein described and claimed, distinguishing features being a one piece annular metallic shrunk-on rim formed with continuous peripheral side flanges with tread block pockets or seats between them, in conjunction with a cap plate or plates formed to secure a plurality of tread blocks in their seats substantially as hereinafter set forth.

The peripheral side flanges on the annular metallic rim perform a double function in that they support the cap plate or plates against lateral strain and displacement and also guard the tread blocks against curb contact, or other lateral contact with extraneous objects, which might be injurious.

Figure 1:
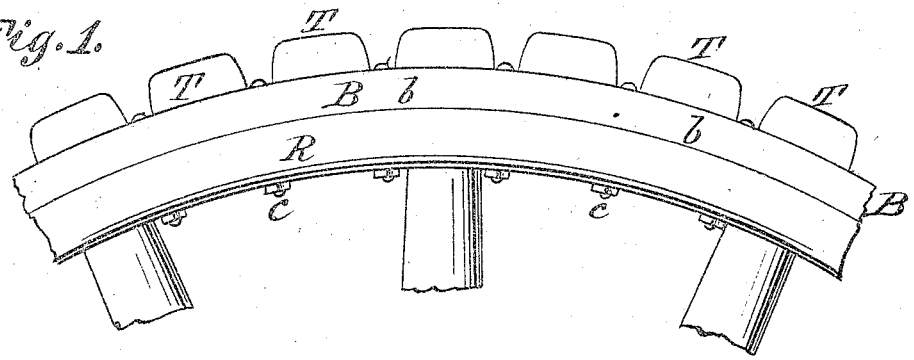
Figure 2:
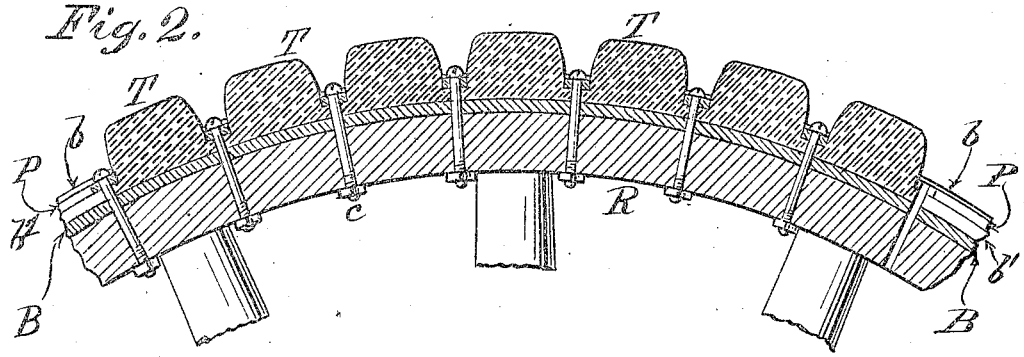
Figure 3:
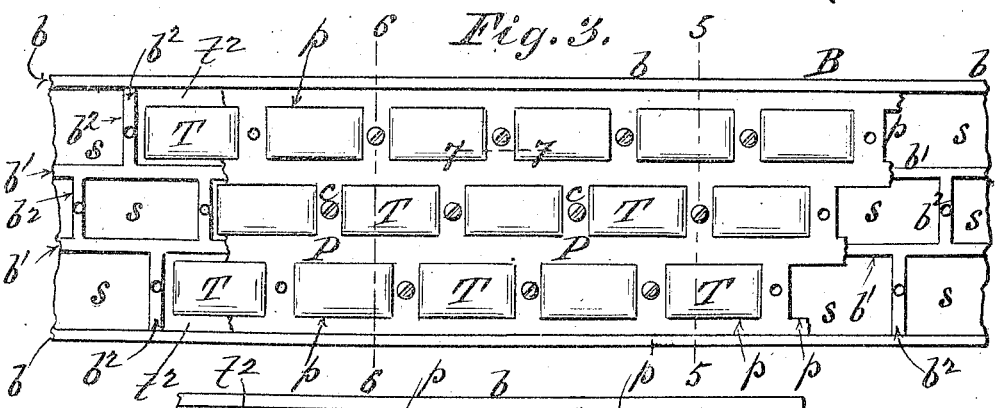
Figure 4:
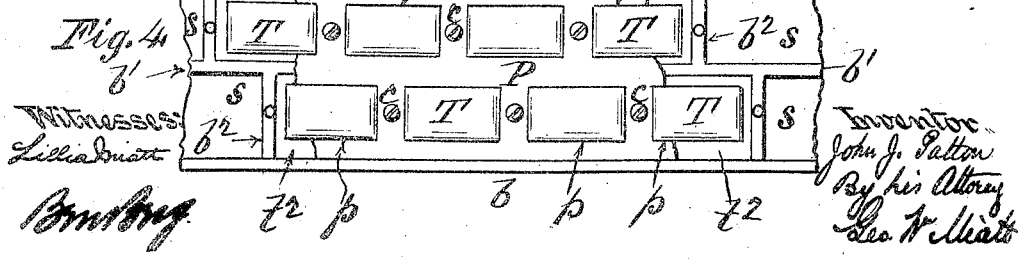

In the accompanying drawings, Figure 1, is a side elevation of a portion of a felly provided with my improved tire; Fig. 2, is a central longitudinal sectional elevation of the same upon plane of line 2—2 Fig. 3; Fig. 3 is a face view of the tire represented as extended in a horizontal plane for convenience of illustration; Fig. 4 is a similar view showing a tire in which two rows of tread blocks are used; Fig. 5 is a transverse section upon an enlarged scale taken upon plane of line 5—5 Fig. 3; Fig. 6, is a similar view taken upon plane of line 6—6 Fig. 3; Fig. 7, is a fragmental section taken upon plane of line 7—7, Fig. 3; Fig. 8 is a top view of an intermediate-row tread block; Fig. 9 is a top view of a side-row tread block; Fig. 10 is a view showing my tire rim shrunk onto the felly of a wheel.

The tire base plate B consists of a continuous annular metallic rim formed in one piece with out-turned peripheral side flanges $b$, and with intermediate longitudinal and transverse flanges $b'$, $b^2$, forming pockets for the treads, said tire base consisting of a metallic plate rolled into said shape and having its ends welded, after which it is shrunk upon the felly R of the wheel W.

The projection of the side flanges $b$, beyond the base plate B is such that they act as guards or fenders for the tread plate P and tread blocks T. That is to say they preferably project beyond the tread plates P, which they also support laterally, thus answering two purposes, as before intimated.

The longitudinal ribs or flanges $b'$, as well as the cross flanges $b^2$, are, say, approximately, one half the height of the side flanges $b$, although this is not material; and they are rectangular in cross section. They thus, with the base plate B form oblong rectangular recesses or pockets $s$, $s$, for the reception of the flanged bases $t$, of the elastic resilient tread blocks T. These pockets $s$, are arranged in two or more longitudinal rows, those on one row "breaking joints" with those in the other row or rows. Thus, in Fig. 4 the transverse center of each pocket is between the two adjoining pockets in the other row, whereas in Fig. 3 the difference is split by placing each pocket in the middle row half way between the medial centers of adjoining pockets in the outer or side rows; and this same principle of arrangement of "breaking joints" symmetrically is resorted to irrespective of the plural number of rows of tread blocks provided for,—the overlapping of the tread blocks longitudinally with relation to each other insuring a continuity of tread surface which is most desirable, and which thus admits of attaining an even unbroken tread contact with the use of relatively small, short tread blocks widely spaced so as to afford ventilation between the comparatively small masses of rubber, thus keeping the tread blocks cool, and avoiding deterioration by over heating, as is apt to occur where large masses of rubber are used, especially when arranged in close proximity to each other, or in actual contact,—one object of my invention being to separate and space the tread blocks for this very reason.

The apertures $p$ in the tread plate or plates P correspond in size and shape with the body of the tread blocks which project through said openings $p$, in the tread plate P, the latter overlapping the base flanges $t$, $t'$, $t^2$, of the tread blocks, and binding them down upon the tire base plate or rim B.

The tire plate or plates P are bolted to the tire, by screw bolts $c$, passing through the base plate B and through either or both transverse or longitudinal ribs or flanges $b'$, $b^2$, as desired,—those shown in the drawings being represented as passing through the transverse base flanges $b^2$, and through the base plate B and felly R of the wheel, although this identical arrangement of bolts is not material.

In the arrangement shown the outer or side rows of tread blocks are formed with one base flange $t^2$, wider than the others $t$, $t'$, so as to abut against the inner sides of the out-turned fender and retain flanges $b$, against which also the edges of the tread plate P abut so as to be supported laterally and held in perfect alinement thereby.

It will be seen that my construction and arrangement of parts is essentially simple and compact, and affords substantial support and security for the tread blocks. The side flanges $b$, of the tire base plate B, while securing the tread plate or plates positively against lateral strain or displacement, also effectually protect said plate and the tread blocks against contact with curb or other extraneous objects.

The tread plate or plates P, being made in two or more sections for the entire wheel, is not only simple and cheap of structure, but affords great strength and rigidity, reinforced as it is by the side flanges $b$, of the tire base plate B. It will be noted also that the tread blocks themselves are of simple form, and are not encumbered with metallic cores, pans, or bases embedded in them, and hence are less subject to internal strain, wear, overheating and deterioration.

What I claim as my invention and desire to secure by Letters Patent, is:

A wheel tire of the character designated, comprising a continuous one piece rolled annular metallic rim shrunk onto the felly of a wheel and formed integrally with out-turned peripheral side flanges and with intermediate longitudinal and transverse ribs on its base constituting pockets, elastic resilient tread blocks having flanged bases seated in said pockets, and a tread plate formed with apertures fitting over the bodies of said tread blocks seated in said pockets and overlapping the flanges on said tread blocks, said tread plate abutting against the inner sides of both of said out-turned peripheral flanges on the rim, and bolts securing said tread plate in position substantially in the manner and for the purpose described.

JOHN J. PATTON.

Witnesses:
GEO. WM. MIATT,
LELLIA MIATT.